May 19, 1931. C. H. GEMBERLING 1,805,484
HARROW HITCH
Filed June 13, 1928 2 Sheets-Sheet 1
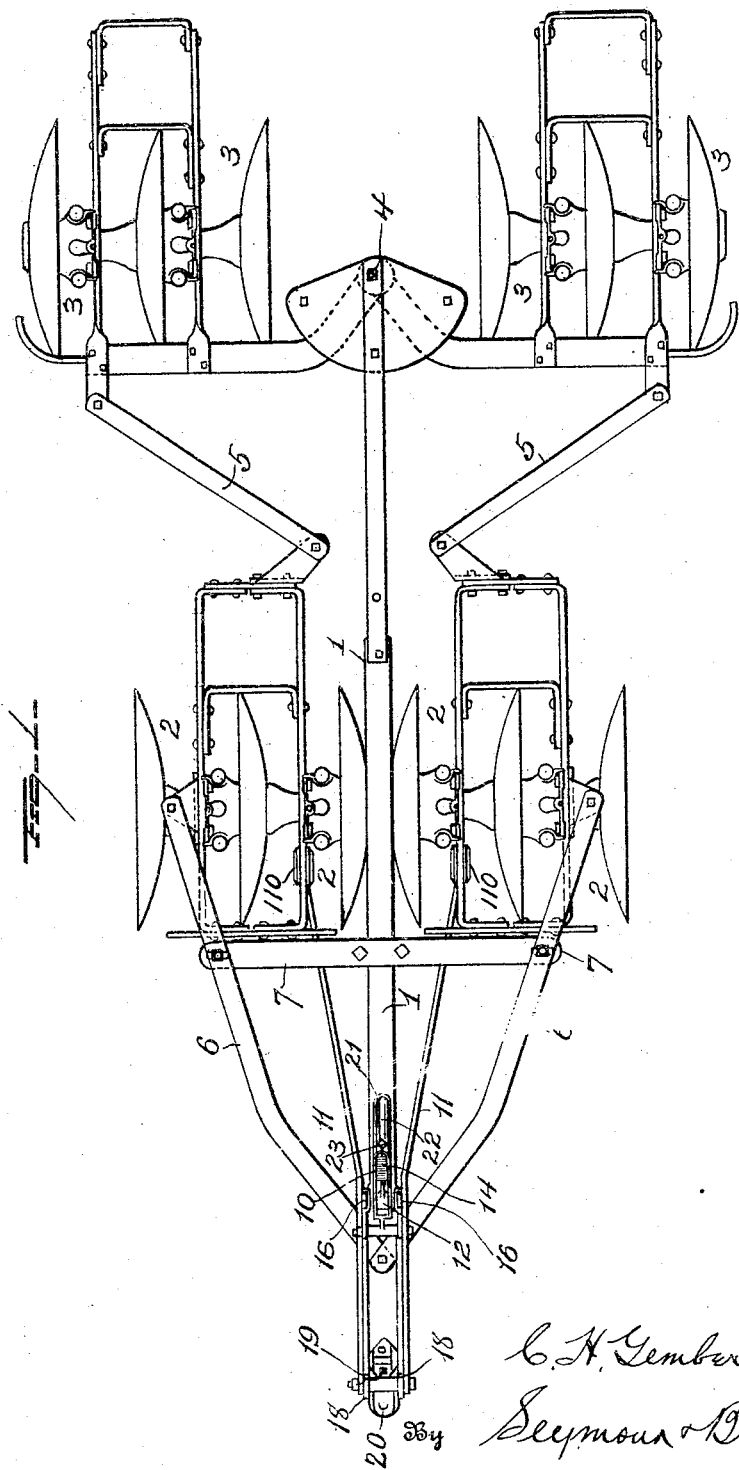

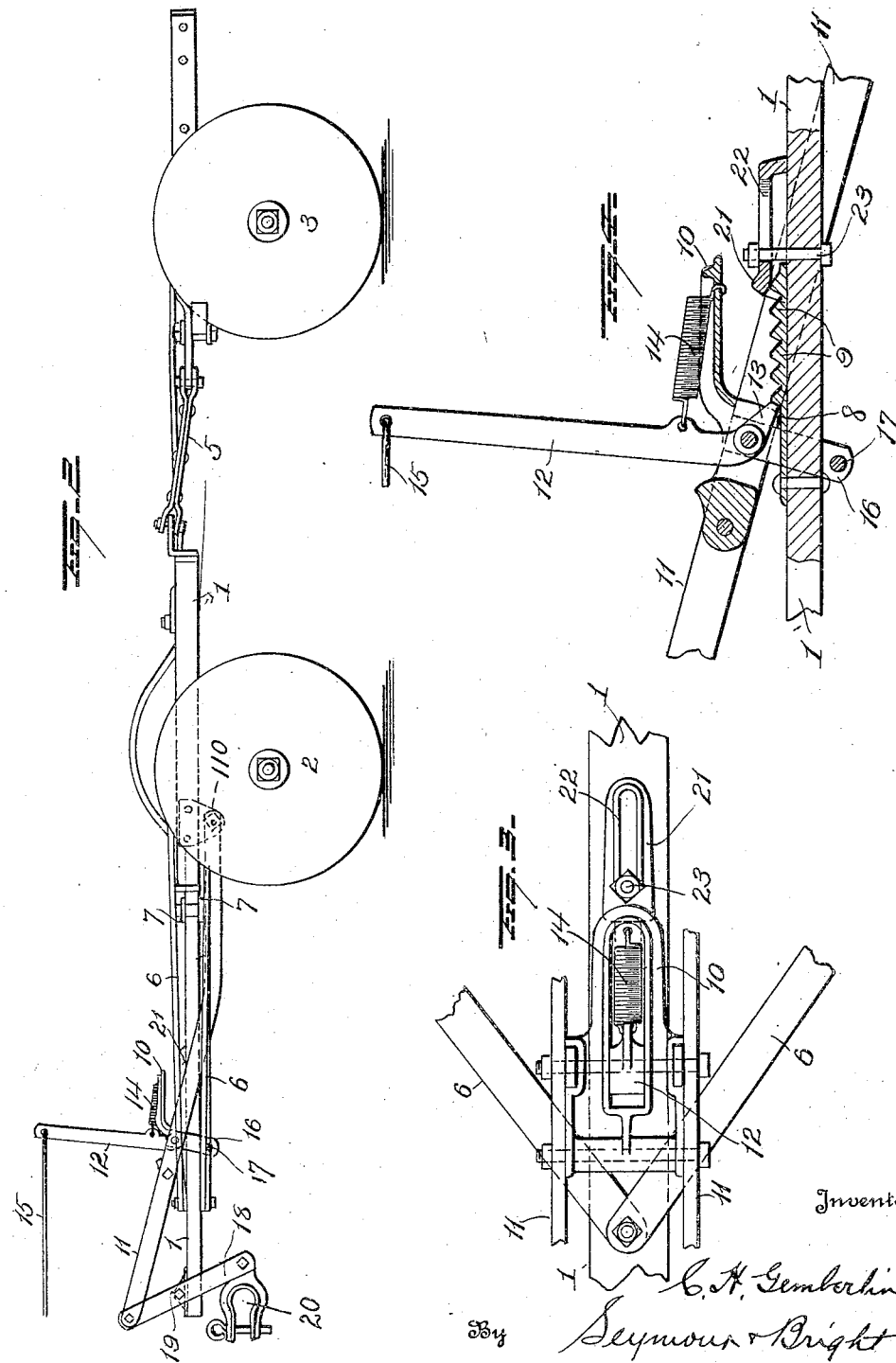

Patented May 19, 1931

1,805,484

UNITED STATES PATENT OFFICE

CAMERON H. GEMBERLING, OF SOUTH BEND, INDIANA, ASSIGNOR, BY MESNE ASSIGNMENTS, TO OLIVER FARM EQUIPMENT COMPANY, A CORPORATION OF DELAWARE

HARROW HITCH

Application filed June 13, 1928. Serial No. 285,180.

This invention relates to gang harrows of the type in which angling of the gangs will be effected by releasing the draft hitch while drawing the harrow forward, and to straighten the gangs it is necessary merely to back the tractor. Draft devices for accomplishing the stated operation heretofore provided were efficient on large harrows, but were uncertain and slow in action when applied to narrow harrows. The object of the present invention therefore, is to provide a draft mechanism which will exert sufficient leverage to quickly set a narrow gang in an angular position, and also to provide means whereby the angling action will be automatically arrested when the gang has reached a predetermined position. The object of the invention is attained in such a mechanism as is illustrated in the accompanying drawings and hereinafter described and the invention resides in certain novel features which will be particularly defined in the appended claims.

In the drawings, Figure 1 is a plan view of a gang harrow having the present invention applied thereto;

Figure 2 is a side elevation of the same;

Figure 3 is an enlarged detail of a portion of the hitch, and Figure 4 is a section of the same.

The harrow comprises a drawbar 1 and front and rear gangs 2, 3 of disks or other harrowing implements, the gangs, in the present instance, being narrow and each containing only three disks. The rear gangs are pivoted to the rear end of the drawbar, as at 4, and are connected with the front gangs by links 5 so that both will be simultaneously set in the angular position. Outer draft bars 6 are pivoted at their front ends to the drawbar and at their rear ends to the outer sides of the frames carrying the front gangs, a cross beam 7 being slidably mounted at its center upon the drawbar and having its ends slidably and pivotally connected with said draft bars.

At the rear of the pivotal connection between the draft bars 6 and the drawbar 1, a rack bar 8 is secured upon the drawbar and said rack bar has longitudinally spaced lugs or teeth 9 on its upper side. Above said rack bar, a rearwardly projecting yoke 10 is secured to and between the inner draft bars 11 which have their rear ends attached to the inner sides of the frames carrying the front gangs, a lever 12 being pivotally mounted at its lower end in the front end of the yoke and having its lower extremity formed into a dog or pawl 13 adapted to engage one of the lugs or teeth 9. The rear ends of the draft bars 11 are, of course, pivotally attached to the harrow frames, the pivot bolts passing horizontally through pendent brackets 110 on the frames which are so formed as to accommodate the lateral oscillation of the pivot during angling of the gangs. A retractile spring 14 attached to the lever and the rear end of the yoke yieldably maintains the engagement of the dog with the lug or tooth, and a rope 15, attached to the upper end of the lever, extends to the tractor to facilitate movement of the lever in opposition to the spring. Straps 16 depend from the front end of the yoke at the sides of the drawbar and are connected by a bolt 17 beneath the drawbar, the yoke, the two straps, and said bolt forming, in effect, a sleeve or slide around the main drawbar and carrying the lever.

The inner draft bars 11 extend forwardly beyond the lever and the sleeve structure, and the front extremities of said draft bars are pivoted to the upper end of a lever or pair of levers 18 fulcrumed at 19 upon the front end of the drawbar. The lever or levers 18 depend below the drawbar and carry a clevis 20 which is adapted to be coupled to a tractor.

It will now be understood that normally the dog 13 engages a lug or tooth 9 and thereby prevents relative movement between the drawbar and the parts associated therewith when the harrow is being drawn forward. If a pull be exerted upon the rope 15 to rock the lever 12, the dog will be released and the draft applied to the clevis 20 will rock the lever 18 and be converted into a pushing force in the inner draft bars 11 which will swing the gangs into angular position which will be determined by releasing the lever 12 whereupon the dog or pawl 13 will drop into engagement with a lug 9. If it be desired to straighten the gangs, the tractor is backed and the lever 18 will then be rocked to exert a pull on the draft bars 11. In angling, the gangs pivot about their connections with the outer draft bars 6. It will be understood that the pull upon the cable 15 is maintained until the gangs have reached the desired angular position and that the lever, the inner draft bars, the straps 16, and the yoke, in effect, slide rearwardly with respect to the draw bar 1 and transmit force longitudinally of the drawbar to effect the angling.

To arrest the angling movement of the gangs, a stop plate 21 is provided, said plate being adjustably secured on the drawbar by a bolt 23 passing through a longitudinal slot 22 in the plate. The front end of the plate projects over the rack bar 8 in the path of the dog 13, and it will be seen at once that, by properly setting the stop plate, the angling of the gangs may be automatically arrested at a predetermined point. As the described arrangement provides fixed supports for the outer sides or ends of the gangs and employs draft bars connected directly to the inner sides or ends of the gangs, it is especially adapted to narrow gangs and effectually utilizes the draft to set the gangs.

Having fully described my invention what I claim as new and desire to secure by Letters-Patent, is:—

1. In a gang harrow, a drawbar, a gang of implements at the side of the drawbar, a fixed draft connection between the drawbar and the outer sides of the gang, a longitudinally shiftable draft bar pivotally connected to the inner side of the said gang, means for holding said gang in working and non-working position, a lever associated with said means and pivoted intermediate its ends to the forward end of said drawbar, said lever having the upper end thereof connected to said draft bar, and a draft clevis connected to the lower end of said lever.

2. In a gang harrow, a drawbar, a gang of implements at the side of the drawbar, a draft connection between the drawbar and the outer side of said gang, a draft bar connected to the inner side of the gang, means for holding said implements in working and non-working position, a draft actuated lever pivoted intermediate its ends to the foremost end of said drawbar, the upper free end of said lever being connected to said draft bar and a draft clevis connected directly to the lower free end of said lever.

3. In a gang harrow, a drawbar, a gang, a fixed connection between the drawbar and the outer side of the gang, a rack on the drawbar, a draft bar connected to the inner side of the gang and having a sliding connection with the drawbar, a draft-actuated lever fulcrumed on the front end of the drawbar and connected to the front end of said draft bar whereby forward draft may cause angling of the gang, and a lever fulcrumed on the draft bar and having a dog engageable with the rack to prevent angling movement.

4. In a gang harrow, a drawbar, a gang, a fixed connection between the drawbar and the outer side of the gang, a draft bar attached to the inner side of the gang and having a sliding connection between its ends with the drawbar, a lever fulcrumed upon the drawbar and extending above and below the same, the upper end of said lever being pivoted to the draft bar and its lower end carrying a draft device, and means cooperating with the sliding connection of the draft bar for limiting the rearward movement of the draft bar.

5. In a gang harrow, a drawbar, a gang, a fixed connection between the drawbar and the outer side of the gang, a rack on the drawbar, a draft bar connected to the inner side of the gang and having a sliding connection with the drawbar, a draft-actuated lever fulcrumed on the front end of the drawbar and connected to the front end of said draft bar, a lever fulcrumed on the draft bar and having a dog engageable with the rack, and a longitudinally adjustable stop on the drawbar projecting over the rear end of the rack in the path of the dog.

6. In a gang harrow, a drawbar, a gang, a fixed connection between the drawbar and the outer end of the gang, a rack on the drawbar, a draft bar pivoted to the inner end of the gang and extending forwardly over the drawbar, a draft lever fulcrumed on the drawbar and pivoted at its upper end to the draftbar and provided at its lower end with means for coupling to a draft appliance, a control lever fulcrumed on the draft bar and constructed to engage the rack to prevent rearward movement of the draft bar, a yoke mounted on the fulcrum of the lever and encircling the drawbar, a yielding connection between the yoke and the lever holding the lever to the rack, and means operable from the draft appliance to disengage the lever from the rack.

In testimony whereof, I have signed this specification.

CAMERON H. GEMBERLING.